Figure 1:
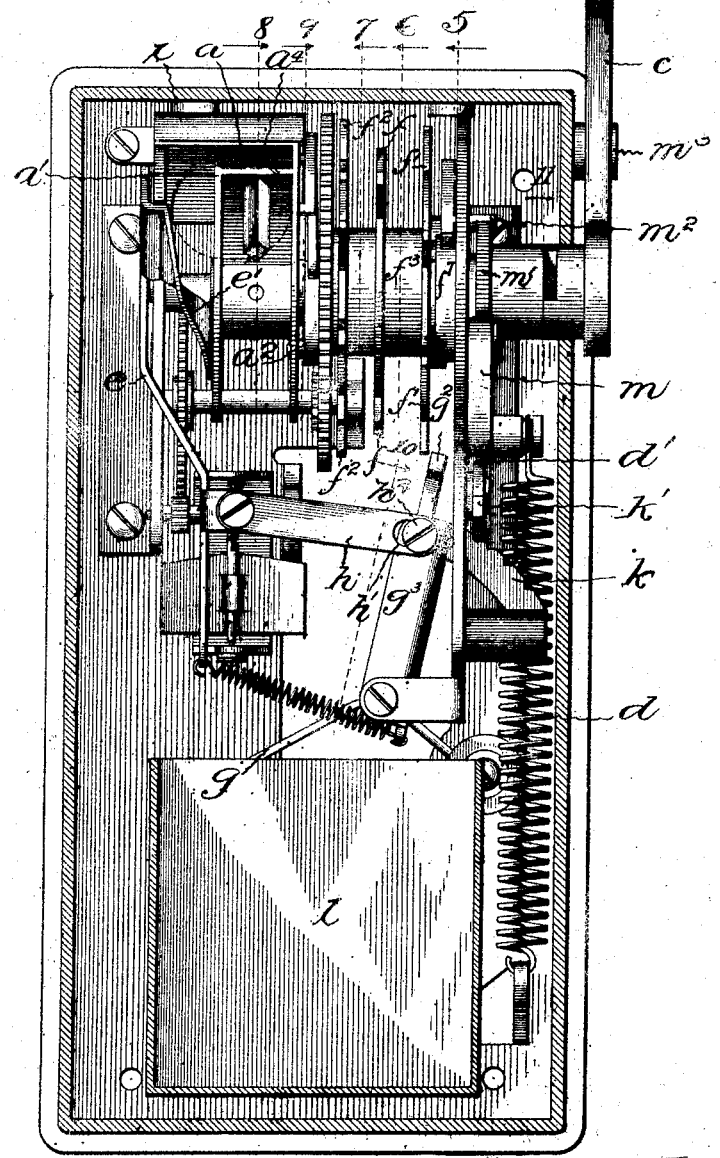

No. 846,500. PATENTED MAR. 12, 1907.
F. R. McBERTY & H. B. HOLMES.
COIN COLLECTOR.
APPLICATION FILED DEC. 7, 1904.

6 SHEETS—SHEET 1.

Witnesses:

Inventors,
Frank R. McBerty
Howard B. Holmes
By Bartow Lamer
Atty.

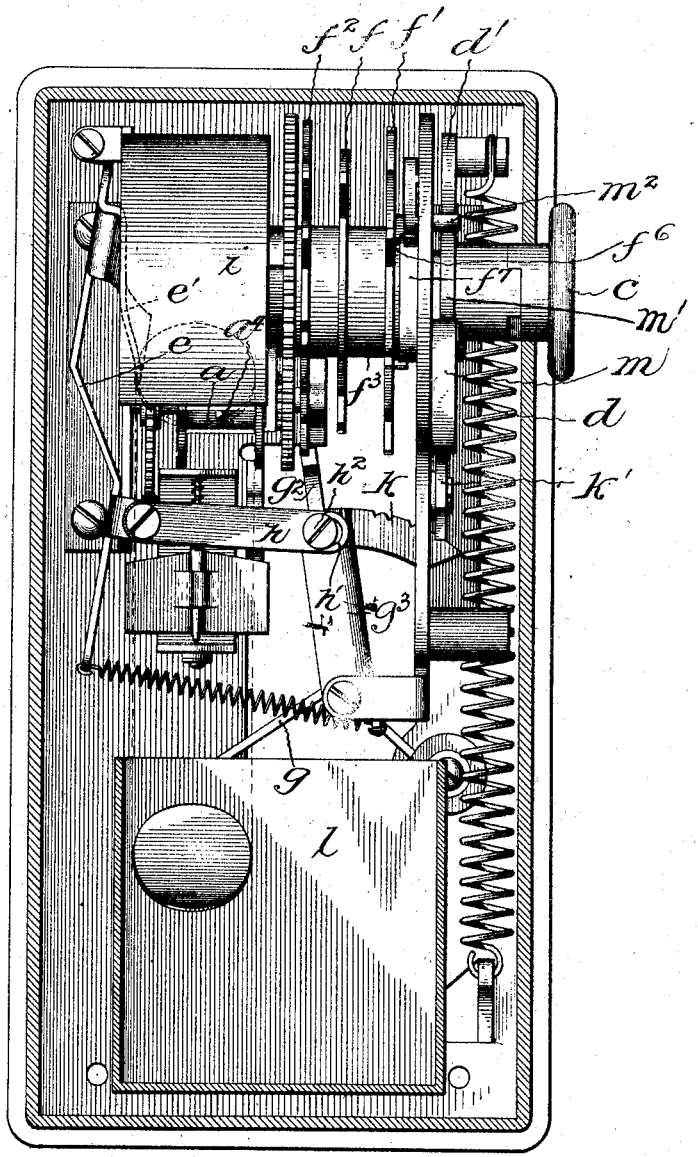

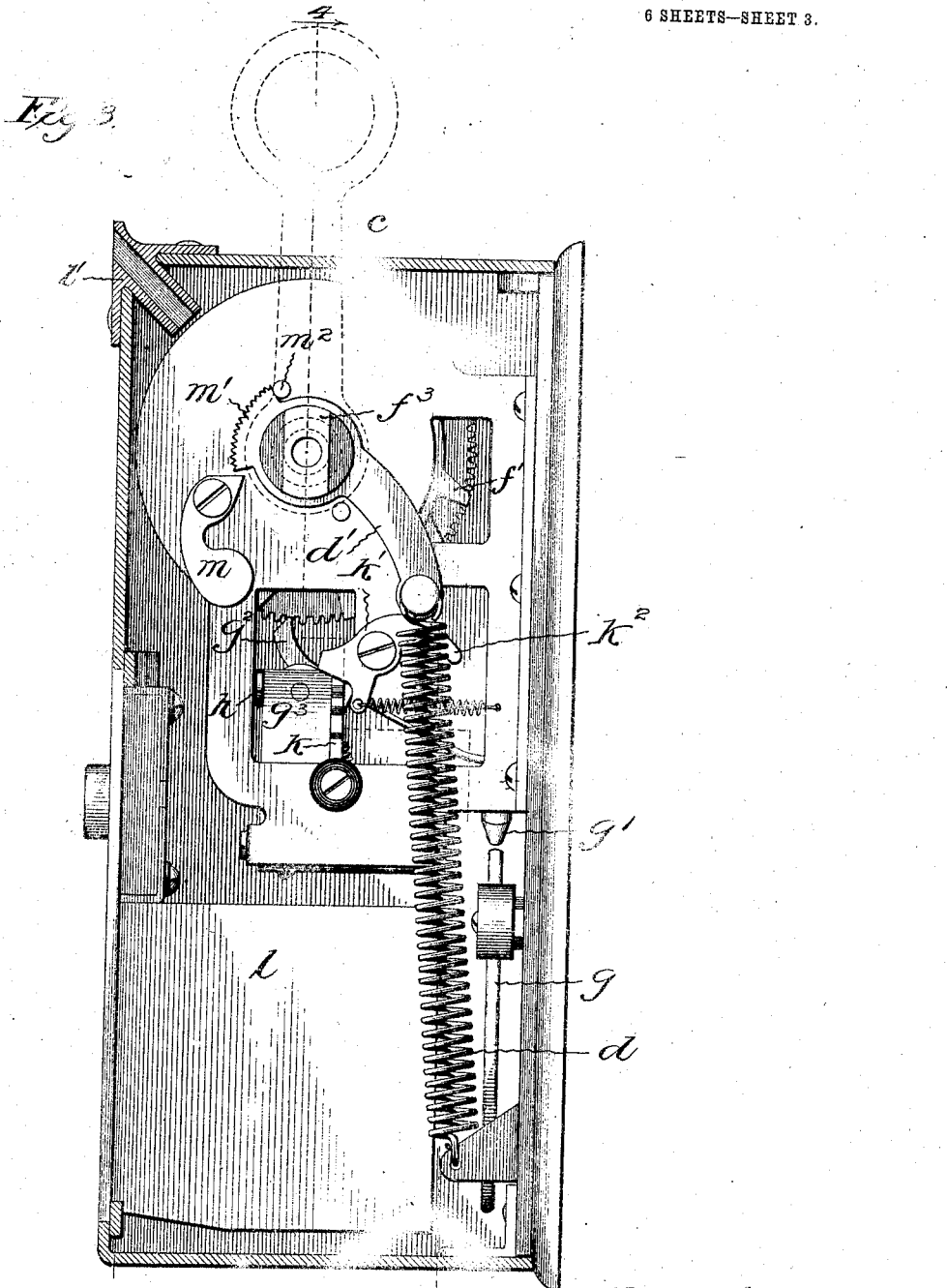

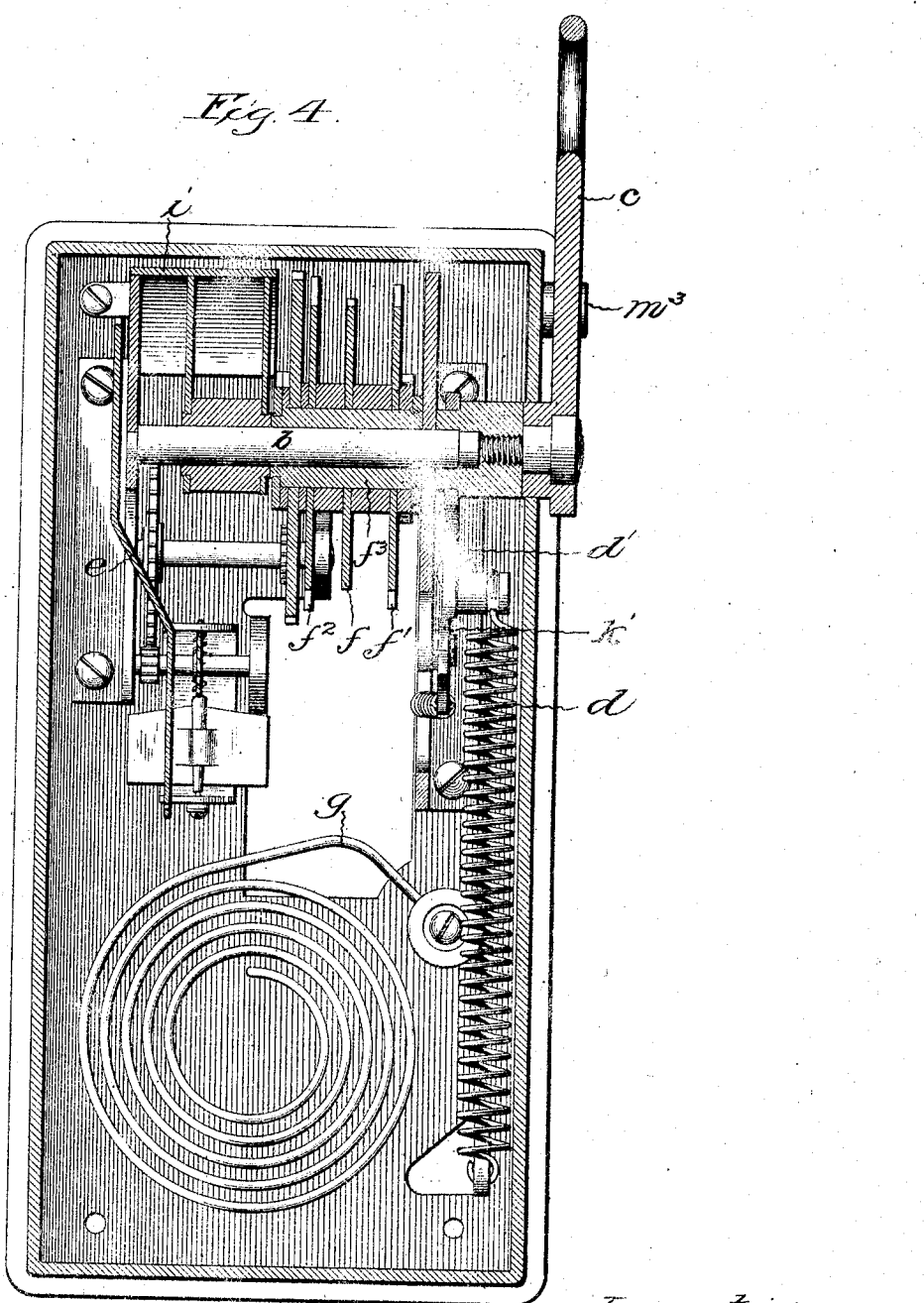

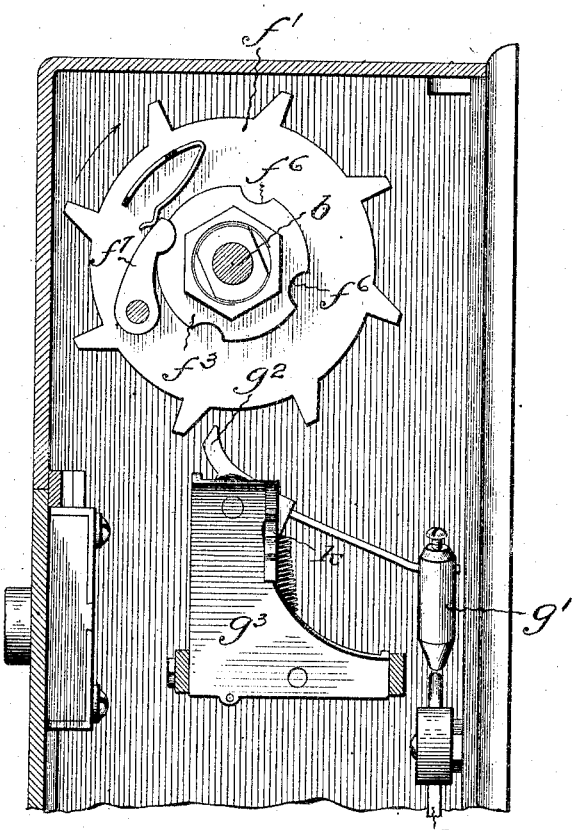
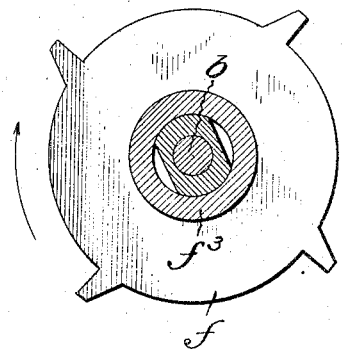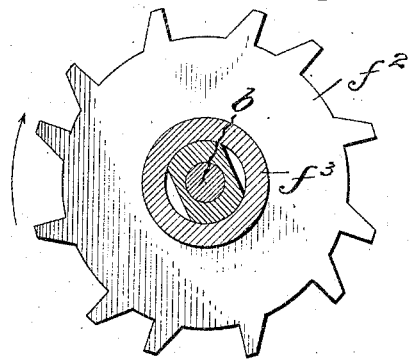

No. 846,500. PATENTED MAR. 12, 1907.
F. R. McBERTY & H. B. HOLMES.
COIN COLLECTOR.
APPLICATION FILED DEC. 7, 1904.
6 SHEETS—SHEET 6.
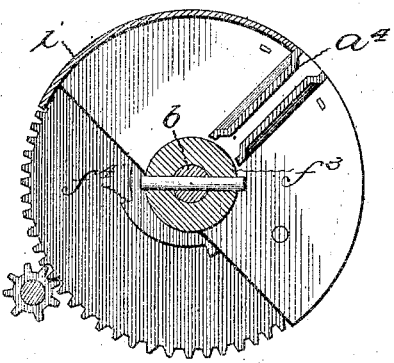
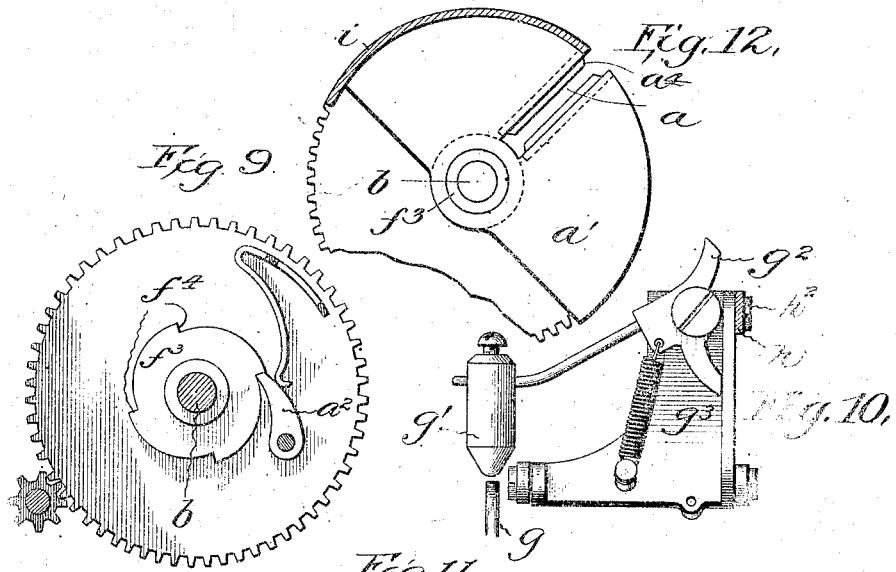
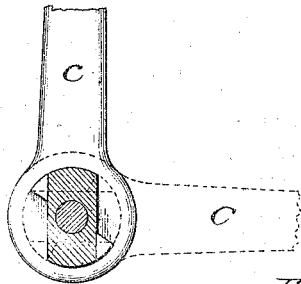
Witnesses:
Inventors:
Frank R. McBerty
Howard B. Holmes
By Barton & Towner
Attys.

UNITED STATES PATENT OFFICE.

FRANK R. McBERTY, OF EVANSTON, AND HOWARD B. HOLMES, OF PARK RIDGE, ILLINOIS, ASSIGNORS TO WESTERN ELECTRIC COMPANY, OF CHICAGO, ILLINOIS, A CORPORATION OF ILLINOIS.

COIN-COLLECTOR.

No. 846,500.      Specification of Letters Patent.      Patented March 12, 1907.

Application filed December 7, 1904. Serial No. 235,858.

*To all whom it may concern:*

Be it known that we, FRANK R. MCBERTY and HOWARD B. HOLMES, citizens of the United States, residing at Evanston and Park Ridge, respectively, in the county of Cook and State of Illinois, have invented certain new and useful Improvements in Coin-Collectors, of which the following is a full, clear, concise, and exact description.

Our invention relates to a toll-box or coin-collector; and its object is to provide an improved device which will be especially adapted for use at a subscriber's station of a telephone-exchange to receive coins of different sizes, the invention being directed particularly toward the means for operating signals to inform the central-office operator of the character of the deposited coin.

The device of our invention is of the general type in which distinctive signals are operated under the control of deposited coins, the signal given being dependent upon the kind of coin which is deposited, so that the operator may have a check upon the subscriber to determine whether a coin of the requisite value has been deposited.

Our invention contemplates a coin-collector having a movable temporary coin-receiver, together with a signal device and a series of signal-controllers each adapted to coöperate with said signal device to produce a distinctive succession of signals, according to the controller selected. The operative relation of the different controllers with the signal device is controlled by a caliper-lever adapted to be adjusted by a coin in the receiver, the controller selected being dependent upon the adjustment of said caliper-lever.

We prefer to mount the temporary coin-receiver upon a rocking shaft, with signal-wheels loosely mounted on the shaft and arranged to be rotated during the return movement of the receiver. The signal-wheels are provided with teeth, the teeth of each wheel being spaced differently than the teeth of its neighbors. The caliper-lever when moved by a coin is adapted to bring a trigger into alinement with one of said disks or wheels, according to the size of the deposited coin, the trigger when engaged by the teeth of any wheel operating a striker to sound a gong a certain number of times. The teeth of the several wheels are so located that each wheel during the rotation thereof will cause a different number of teeth to engage the trigger than either of its neighbors, so producing a distinctive signal, which will be clear and unmistakable. The trigger and striker may have a support connected with the caliper-lever and arranged to be moved thereby to bring the trigger into alinement with any disk, and said support may carry a latch-bar adapted to be engaged by a dog to lock the support in its adjusted position.

A handle is provided for moving the shaft carrying the coin-receiver forward, and a spring may be provided for returning the shaft to its normal position, means being operated in the return of the coin-receiver for moving said dog to release the support of the signal mechanism.

Minor features of the invention consist of improved means for preventing fraudulent operation or "beating" of the device, as by the use of improper coins, &c.

We will describe our invention by reference to the accompanying drawings, which illustrate the preferred embodiment thereof, and the particular parts, improvements, or combinations which we consider novel with us will be set forth in the appended claims.

Figure 1 is a front elevation of the coin-collector embodying our invention with the cover in section. Fig. 2 is a similar view with the parts in an alternative position. Fig. 3 is a side elevation of the coin-collector with the cover in section. Fig. 4 is a vertical sectional view on line 4 4 of Fig. 3. Fig. 5 is a vertical sectional view on line 5 5 of Fig. 1, and Figs. 6 and 7 are detail views of two of the signal-controlling disks. Fig. 8 is a detail sectional view on line 8 8 of Fig. 1 showing the construction of the temporary coin-receiver. Fig. 9 is a detail sectional view on line 9 9 of Fig. 1, showing the pawl carried by the coin-receiver for rotating the signal-controlling disks during the return movement of the receiver. Fig. 10 is a detail view of the signal-operating mechanism which is adjusted by the caliper-lever into operative relation to some one of the signal-disks, and Fig. 11 is a detail view of the pivotal connection of the handle *c* to illustrate its provision of lost motion. Fig. 12 is a view on line 12 12 of Fig. 1.

The same parts are indicated by similar letters of reference in each of the figures of the drawings.

The temporary coin-receiver $a$ is carried by a rocking shaft $b$, having a handle $c$ upon the outside of the cover of the box for turning the shaft to move the coin-receiver forward and a spring $d$ for returning the shaft and coin-receiver to their normal positions. The spring $d$ may be connected with the shaft through the medium of an arm $d'$, carried by the shaft. The coin-receiver has an opening in the side wall $a'$, through which a coin held in the receiver may project, such coin during the advance movement of the coin-receiver being adapted to move a caliper-lever $e$, preferably by engaging an extension $e'$, carried by said lever, the extent of displacement of said lever depending, in the device shown, upon the diameter of the deposited coin.

The caliper-lever is arranged in its movement to adjust signal mechanism into operative relation to some one of a number of signal controllers or wheels adapted to be rotated by the coin-receiver in its return movement, and so produce a distinctive signal, according to the character of the coin deposited. The signal-wheels may comprise a number of toothed disks $f\ f'\ f^2$, the spacing of the teeth of each wheel differing from each of its neighbors. The disks may be carried by a collar $f^3$, loosely mounted upon the shaft $b$ and arranged to be rotated in the return movement of the coin-receiver. The collar $f^3$ is provided with ratchet-teeth $f^4$, Fig. 9, preferably four in number, at the end thereof adjacent to the receiver, said teeth being located at regular intervals around the circumference of the collar, and the coin-receiver may carry a pawl $a^2$, adapted to engage said teeth to cause the collar and disks to rotate with the shaft $b$ in the return movement of the receiver. In the particular structure shown the pawl will rotate the wheels throughout a quarter-revolution during the return movement of the coin-receiver $a$, and the teeth $f^4$ are so arranged that the coin-receiver must make a complete forward movement before the pawl can engage a tooth $f^4$ to rotate the wheels. This prevents confusion in the operation of the device and consequent false signals which might arise from a depositor advancing the receiver less than the full required distance before allowing it to return. The collar $f^3$ also is provided at its other end with recesses $f^6$ therein, Fig. 5, located at regular intervals apart from rotating with the shaft in the forward or setting movement of the handle $c$.

The signal mechanism adapted to be operated by the signal-wheels may comprise a spiral steel gong $g$, with a striker $g'$ for sounding the same, the operation of the striker being controlled by a trigger $g^2$, which is adapted to be engaged by the teeth of any selected signal-wheel and to be operated thereby to sound a distinctive signal. The trigger and striker may be carried upon opposite ends of a lever pivoted to a support $g^3$, which is in turn pivoted to the framework of the device and connected by a link $h$ with the caliper-lever $e$, to be moved thereby. Upon the movement of the caliper-lever by a coin in the receiver as said receiver is rotated forward—that is, when the handle $c$ (shown in Fig. 1) is pulled down toward the observer—the trigger-support $g^3$ is moved into a position to bring the trigger into alinement with one of the said disks, the position to which the trigger-support is moved being determined by the size of the coin. During the return movement of the receiver, which is brought about by spring $d$ acting upon the arm $d'$, carried by the shaft $b$, the wheels are rotated, and a number of the teeth of the particular wheel selected will engage the trigger to operate the striker a certain number of times. In the present instance as the wheels move through a quarter-revolution during the return movement of the coin-receiver the number of times the gong is sounded will depend upon the number of teeth located upon a quarter of the circumference or periphery of the selected wheel. In the device illustrated the teeth upon the disks or signal-wheels $f\ f'\ f^2$ are spaced so that the disk $f$ will during this quarter-revolution operate the trigger once, and the disks $f'\ f^2$ when in operative relation to the trigger will actuate the same two and three times, respectively, thus giving the different signals. These different signals may correspond to a nickel, a dime, and a quarter-dollar, respectively.

During the advance movement of the coin-receiver and after the trigger has been brought into alinement with the particular disk selected the coin passes beyond the end of the caliper-plate $e'$, which is arranged to fall behind it, so that in case an attempt is made to retain the coin by bringing the receiver back to its normal position with a coin remaining therein the end of the caliper-plate will engage the coin and block the return adjustment of the trigger. This preferably accomplished by providing a slot $h'$ in the link $h$, in which a stud $h^2$ of the trigger-support $g^3$ slides, so that the link and lever may move back, although the trigger-support is held against backward movement by the ratchet-pawl $k'$. The coin-receiver may also carry an arc-shaped shield $i$, adapted to bear against and cover the inner mouth of the coin-chute $l'$ during the forward movement of the coin-receiver, this shield operating to cut any thread or the like which may have been attached to the coin. We also provide a locking device adapted to maintain the trigger-support in any operative position to which it may be adjusted, with means adapted to be operated after the signal has been given for counteracting the locking device to restore the support and its apparatus to normal position. For this purpose we preferably employ a latch-bar $k$, secured to the support $g^3$, the teeth of said bar being adapted to be engaged by a spring-actuated dog $k'$ when the handle $c$ is moved forward to lock the support in any position to which it may be adjusted. As the coin-receiver returns to its normal position the arm $d'$ of the shaft $b$ engages a finger $k^2$, carried by said dog, to move the same out of engagement with said latch-bar, and so allow the support to return to its normal position.

A cash-box $l$ is arranged to receive the coin as it is discharged from the temporary receiver after the caliper-lever has been set. In the present form of the device the coin-receiver is brought into a diagonal position at the end of its advance movement, so that the coin simply falls therefrom into the box. The coin-receiver may have a rib $a^4$ upon the inner surface of each of its sides, so that a coin moistened and placed within the receiver will not stick to the sides, but will be ejected from the receiver into the cash-box at the proper time.

We preferably provide mechanism for retarding the movement of the coin-receiver and associated signal-wheels, so that the signals produced by the striker and gong will be separated and distinct. This mechanism may comprise a train of gear-wheels and a suitable fan-escapement, as shown.

We preferably mount a toothed segment $m'$ upon the shaft $b$, Fig. 3, adapted to be engaged by a pivoted ratchet-detent $m$ as the shaft is rocked forward, so that the shaft cannot be given a partial forward movement and then allowed to return to its normal position to produce a wrong signal. The shaft must be rocked throughout the entire distance to bring the toothed segment $m'$ into the position shown in Fig. 2, whereupon the ratchet-detent $m$ will return of its own weight to a position where it will permit the return of the segment $m'$ to normal. The frame may also carry a stop $m^2$, adapted to engage the segment $m'$ to limit the return movement of the shaft carrying the coin-receiver. The handle $c$ may be arranged to have a definite amount of lost motion with relation to the shaft $b$, as shown in Fig. 11, so that a person attempting to hasten the return of the coin-receiver by forcing back said handle will simply move the handle back to its original position against a stop $m^3$ on the outside of the box without affecting the movement of the shaft $b$ and the coin-receiver carried thereby.

The operation of the device, briefly, is as follows: The subscriber first deposits a coin in the chute $l'$, which leads from the outside of the box to the temporary coin-receiver $a$, and then pulls down the handle or lever $c$, thus rocking the shaft $b$ and carrying the receiver $a$ forward. The coin during such forward movement of the receiver engages the caliper-plate $e'$ and moves the caliper-lever $e$, the extent of displacement of said lever depending upon the diameter of the coin. The lever thereupon moves the support $g^3$ to bring the trigger $g^2$ into alinement with one of said disks—for example, disk $f^2$, as shown in Fig. 2. The coin at the end of said forward movement of the receiver passes into the cash-box $l$. The arm $d'$ is by the forward movement of the shaft raised from engagement with the finger $k^2$ to allow the dog $k'$ to engage the teeth of the latch-bar $k$, carried by said support, to lock said support in its adjusted position. Upon releasing the handle $c$ the shaft $b$ begins its return movement, impelled by the spring $d$, and the pawl $a^2$, which is in engagement with one of the teeth $f^4$ of the collar $f^3$, carrying the signal wheels or disks, effects the rotation of said collar and disks until the receiver $a$ has been returned to its normal position. In the device illustrated the disks will be rotated throughout a quarter of a revolution. During the rotation of the signal-disks the teeth of the selected disk $f^2$, which is the only disk in alinement with the trigger, engages said trigger to operate the gong a certain number of times, depending upon the period of revolution of the disks. In the present instance as the disks only rotate through a quarter-revolution only the teeth on a quarter of the periphery of the disk $f^2$ will engage the trigger. The disk $f^2$ in the present structure is provided with three teeth to each quarter of its periphery, so the trigger will be operated three times during the return movement of the receiver $a$. At the end of such return movement the pawl $f^7$ enters a recess $f^6$ in the collar carrying the disks, and so insures the stopping of the disks at the proper point.

In case a coin is deposited of a size not intended for use in the device, such as a one-cent piece, the same will be deposited without effecting the operation of the gong. Such coin during the forward movement of the receiver moves the caliper-lever to adjust the trigger to a position out of alinement with any of such disks, and accordingly as the disks revolve during the return movement of the receiver the trigger will not be operated.

We claim—

1. In a toll-box, the combination with a movable coin-receiver, of a signal device, a series of signal-controllers each arranged to coöperate with said signal device to produce a distinctive succession of signals according to the controller selected, and a caliper-lever constructed and arranged to be adjusted by a coin in the receiver, and to bring different ones to said controllers and the signal device into operative relation to each other, the controller selected being dependent upon the adjustment of said caliper-lever, whereby a distinctive succession of signals is produced according to the size of the deposited coin.

2. In a toll-box, the combination with a movable temporary coin-receiver, of a caliper-lever constructed and arranged to be adjusted by a coin in said receiver during the advance movement thereof, toothed disks arranged to be rotated in the movement of said coin-receiver, the teeth of each disk being spaced differently from its neighbors, a signal-actuating device arranged to be adjusted by said caliper-lever and brought thereby into operative relation to any disk, according to the size of the deposited coin, the selected disk being adapted in its rotation to engage said signal-actuating device to produce a distinctive signal.

3. In a toll-box, the combination with a temporary coin-receiver, of a rocking shaft carrying said coin-receiver, a caliper-lever constructed and arranged to be operated by a coin in said receiver during the advance movement thereof, a number of signal-wheels loosely mounted upon said shaft and arranged to be rotated by the coin-receiver in its return movement, and a signal-actuating trigger arranged to be adjusted by said caliper-lever into operative relation to any one of said signal-wheels, according to the size of the deposited coin, to produce a distinctive signal in the return movement of said receiver.

4. In a toll-box, the combination with a rocking temporary coin-receiver, of a caliper-lever constructed and arranged to be adjusted by a coin in the receiver during the advance movement thereof, toothed signal-wheels arranged to be rotated during the return movement of said coin-receiver, a signal-actuating trigger in position to be moved by said lever into alinement with any one of said wheels dependent upon the size of the deposited coin, said trigger being engaged by the disk in its rotation to give a distinctive signal, said caliper-lever when adjusted by a coin of improper size being arranged to move said signal-controlling mechanism into a position out of alinement with any of said wheels.

5. In a toll-box, the combination with a rocking temporary receiver, of a caliper-lever constructed and arranged to be adjusted by a coin in the receiver during the advance movement thereof, a signal device, actuating mechanism therefor adjusted by said lever to a position dependent upon the size of the deposited coin, a locking device for holding said actuating mechanism in its adjusted position, a number of signal-wheels rotated during the return movement of said coin-receiver, each of said signal-wheels being arranged to operate the actuating mechanism of said signal device to give a distinctive signal according to the position of adjustment of said mechanism, and means actuated in the return of said coin-receiver for counteracting said locking device.

6. In a toll-box, the combination with a rocking temporary receiver, of a caliper-lever constructed and arranged to be adjusted by a coin in the receiver during the advance movement thereof, a signal device, a striker therefor, a trigger controlling said striker, a support for said striker and trigger arranged to be adjusted by said caliper-lever to a position dependent upon the size of the deposited coin, a number of toothed wheels arranged to be rotated in the return movement of the coin-receiver, the teeth of each wheel being spaced differently from its neighbors, the teeth of said plate during the rotation thereof being arranged to engage said trigger according to the position of adjustment and operate the signal device to produce a distinctive signal.

7. In a toll-box, the combination with a rocking shaft, of a temporary coin-receiver carried thereby, a caliper-lever constructed and arranged to be set by a coin in said receiver during its movement in one direction, a collar loosely mounted upon the shaft, signal-wheels secured thereto, teeth for said collar, a pawl carried by said coin-receiver adapted to engage the teeth of said collar during its return movement to rotate the same, signal mechanism arranged to be moved by said caliper-lever into operative relation to any one of said wheels, according to the size of the deposited coin, such wheel during its rotation operating said mechanism to produce a distinctive signal, and escapement mechanism arranged to retard the return movement of said coin-receiver and the rotation of said wheels.

8. In a toll-box, the combination with a rocking shaft, of a temporary coin-receiver carried thereby, a caliper-lever constructed and arranged to be adjusted by a coin in the receiver during the advance movement thereof, a number of toothed disks loosely mounted upon said rocking shaft and arranged to be rotated in the return movement of said coin-receiver, the teeth of each disk being spaced differently from the teeth of its neighbor, a gong, a striker therefor, a trigger controlling said striker, a support for said trigger and striker adapted to be adjusted by said caliper-lever to bring said trigger into alinement with any one of said disks, according to the size of the deposited coin, the teeth of said disk in its rotation engaging said trigger to produce a distinctive signal, a locking device arranged to maintain said support in its adjusted position, and means actuated in the return of said coin-receiver for counteracting said locking device to release the said support.

9. In a toll-box, the combination with a temporary coin-receiver, of a rocking shaft carrying said coin-receiver, a handle for moving said shaft forward, a caliper-lever constructed and arranged to be set in the forward movement of said coin-receiver, a number of toothed disks loosely mounted upon said shafts and arranged to be rotated by said coin-receiver in the return movement thereof, the teeth of each disk being spaced differently from its neighbors, an audible-signal device, a striker therefor having a support arranged to be adjusted by said caliper-lever to bring the end of the striker into alinement with the teeth of any wheel according to the size of the deposited coin, whereby the striker will be operated a predetermined number of times to produce a distinctive signal, a latch-bar carried by said support, a detent arranged to engage the teeth of said latch-bar to hold the support in its adjusted position, an arm carried by said shaft, and a spring connected with said arm and adapted to effect the return of said coin-receiver to its original position, said arm being arranged in the end of its movement to engage said detent to release the said support.

10. In a toll-box, the combination with a rocking shaft, of a temporary coin-receiver carried thereby having an opening in the side through which a coin may project, a lever, a caliper-plate arranged to be engaged by a coin in the receiver during the forward movement thereof to adjust said lever, signal-wheels arranged to be rotated by said coin-receiver in its return movement, signal mechanism arranged to be brought into alinement with each of said wheels according to the size of the deposited coin, to be operated thereby and give a distinctive signal, and a cash-box adapted to receive the coin at the end of the forward movement of the receiver, and means for moving said caliper-plate back of each coin during the forward movement of the receiver to prevent the coin from being carried back in the return movement of said receiver.

11. In a toll-box, the combination with a rocking shaft, of a temporary coin-receiver carried thereby having an opening in the side through which the coin placed therein projects, a lever, a caliper-plate carried thereby arranged to be engaged by a coin in the receiver during the advance movement thereof to adjust said lever, a cash-box arranged to receive a coin from said receiver at the end of its forward movement, signal-wheels adapted to be rotated by said coin-receiver in its return movement, signal mechanism arranged to be moved by said lever into alinement with any one of said wheels, according to the size of the deposited coin, to be operated thereby in the rotation of such wheel, a locking device arranged to hold said signal mechanism in its adjusted position, said caliper-plate falling behind the coin after the locking of said signal mechanism to prevent the fraudulent return of the coin, said lever having a definite lost motion with respect to said signal mechanism, whereby the lever and caliper-plate may move to bring the end of the plate behind the coin without disturbing the adjustment of said signal-controlling mechanism.

12. In a toll-box, the combination with a rotating temporary coin-receiver, signal mechanism actuated in the return movement thereof, a handle for moving said coin-receiver, and stops limiting the movement of said handle, said handle having a definite lost motion with respect to the receiver upon the return movement thereof, whereby undue interference with the signal mechanism by a forced return of the handle is prevented, as described.

13. In a toll-box, the combination with a rotating temporary coin-receiver, of a transverse slot therein arranged to receive the coin, and ribs formed in said receiver in the sides of said slot upon which the coin is adapted to rest, whereby sticking of the flat sides of the coin to the walls of the receiver is prevented.

14. In a toll-box, the combination with a movable coin-receiver, of a signal device, a caliper-lever constructed and arranged to be adjusted by a coin in the receiver during the movement of said receiver, the extent of its adjustment being dependent upon the size of such coin, and means controlled by said lever when adjusted for causing said signal device to give a signal distinctive to the size of the deposited coin.

15. In a toll-box, the combination with a coin-receiver, of a signal device, a series of controlling means each adapted to cause said signal device to give a distinctive signal, and caliper mechanism associated with the coin-receiver, adapted to be adjusted by a coin in the receiver, and arranged to bring different ones of said controlling means and the signal device into operative relation to each other, the controlling means selected being dependent upon the adjustment of the caliper mechanism; whereby a distinctive succession of signals is produced according to the size of the deposited coin.

16. In a toll-box, the combination with a movable coin-carrier adapted to receive coins of various sizes, of a cash-box adapted to receive a coin of any of such sizes from said carrier at the end of its forward movement, means for preventing the return of the carrier until the coin therein has been discharged, and distinctive signal mechanism controlled by coins in said carrier.

17. In a toll-box, the combination with a movable coin-carrier, of a cash-box into which a coin is discharged from said carrier at the end of its forward movement, a caliper-lever constructed and arranged to be adjusted by a coin in said carrier, means controlled by said lever for preventing the return movement of the carrier until said coin is discharged, and signal mechanism controlled by the adjustment of said lever.

18. In a toll-box, the combination with a movable coin-receiver, of a signal device, a series of signal-controlling mechanisms each arranged to coöperate with said signal device to produce a distinctive succession of signals, a caliper-lever constructed and arranged to be adjusted by a coin in the receiver, and means controlled by the coin in its adjustment adapted to bring different ones of said signal-controlling mechanisms and the signal device into operative relation to each other, the signal-controlling mechanism selected being dependent upon the adjustment of said caliper-lever.

19. In a toll-box, the combination with a coin-receiver, of a signal device, a series of signal-controllers each arranged to coöperate with said signal device to produce a distinctive signal, and a lever constructed and arranged to be adjusted by a coin in the receiver to bring different ones of said controllers and the signal device into operative relation to each other, the controller selected being dependent upon the adjustment of said lever.

20. In a toll-box, the combination with a movable coin-receiver, of a signal device, a series of distinctive signal-controllers, and a lever constructed and arranged to be adjusted by a coin in the receiver during the movement thereof to bring different ones of said controllers and the signal device into operative relation to each other; whereby said signal device may produce a variety of signals dependent upon the coin deposited.

In witness whereof we hereunto subscribe our names this 23d day of September, A. D. 1904.

FRANK R. McBERTY.
HOWARD B. HOLMES.

Witnesses:
FREDERICK P. McINTOSH,
ARTHUR G. TEYMEYER.